Figure 1:
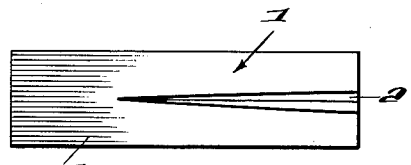

Oct. 17, 1961 R. W. WOLF 3,004,785
EXPANDING ROD JOINT
Filed Jan. 7, 1959 2 Sheets-Sheet 1

INVENTOR
ROBERT W. WOLF,
BY Larson and Taylor
ATTORNEYS

Oct. 17, 1961 — R. W. WOLF — 3,004,785
EXPANDING ROD JOINT
Filed Jan. 7, 1959 — 2 Sheets-Sheet 2

INVENTOR
ROBERT W. WOLF,
BY Larson and Taylor
ATTORNEYS

United States Patent Office 3,004,785
Patented Oct. 17, 1961

3,004,785
EXPANDING ROD JOINT
Robert W. Wolf, Philadelphia, Pa., assignor to Heintz Division—Kelsey-Hayes Company, Philadelphia, Pa., a corporation of Pennsylvania
Filed Jan. 7, 1959, Ser. No. 785,359
4 Claims. (Cl. 287—64)

This invention relates to an expanding rod joint and to a means for joining a pair of ends of two parallel rods so as to form an energy absorbing joint.

The present invention provides a means whereby two rods may be joined together at one end thereof so that the rods may be pulled apart into continuous lengths, the joint forming an energy absorbing means. It can be appreciated that when a sudden force is applied to spread two parallel rods, if the entire force is exerted at a single point on the joint, there would be a tendency for the joint to break at that particular point. By virtue of the present invention this possibility is eliminated in that the separation force is distributed and the impact is absorbed before the load reaches maximum and the maximum point of joint strength is reached.

According to the present invention there is provided a series of end blocks which are used to interconnect the parallel rods. Each end block has a cross-section which is substantially equal to the cross-section of a pair of rods. Each end block is formed with a tapered groove which extends between the point of welding of the rod ends and the midportion of the block. The rod ends are welded or brazed to the end block and a whole series of these blocks and rods may be assembled making a mat that may be curved and joined to form a cylindrical structure. A force tending to expand the parallel rods so as to extend them to a continuous length will be absorbed by the end blocks. The block will tend to shear or tear along the grooved portion so that this groove forms an energy absorbing means. The maximum strength of the end block is at that portion where no groove is present and the full cross-section of the block is available. It is at this point that maximum bending occurs rather than at the point where the rod is welded to the end block.

The present invention has particular application in what is known as a continuous rod warhead. A projectile is provided with an encircling band of rods and end blocks connected in the manner hereinafter described. At a predetermined time or at a predetermined point the exploding force of the projectile expands the cylindrical rod and end block assembly so that it forms a large circular continuous rod. This continuous rod which is moving forwardly at high speed can inflict great damage to enemy aircraft, and the like.

An object of the present invention is to provide a means for connecting a pair of ends of rods in which the joint provides means for absorbing the impact of a force tending to extend the parallel rods.

Another object of the present invention is to provide a means for joining a pair of rods to an end block so that when a force is applied tending to extend the rods into a continuous length, the point of maximum bending will not be at the point where the rods are welded to the end block.

Figure 2:
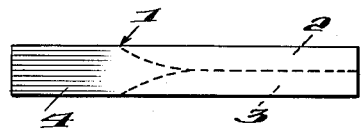
Figure 3:
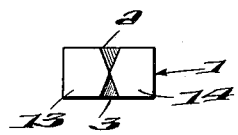
Figure 4:
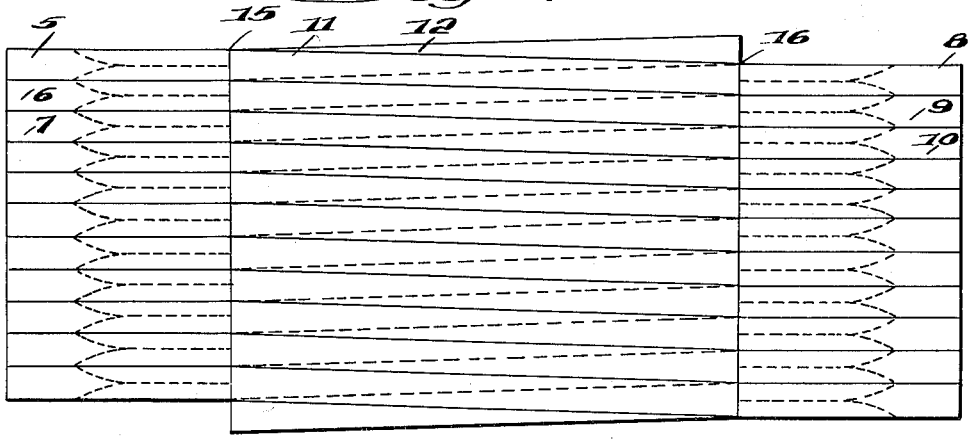
Figure 5:
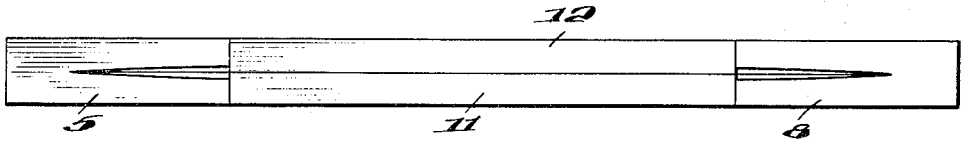
Figure 6:
Figure 7:
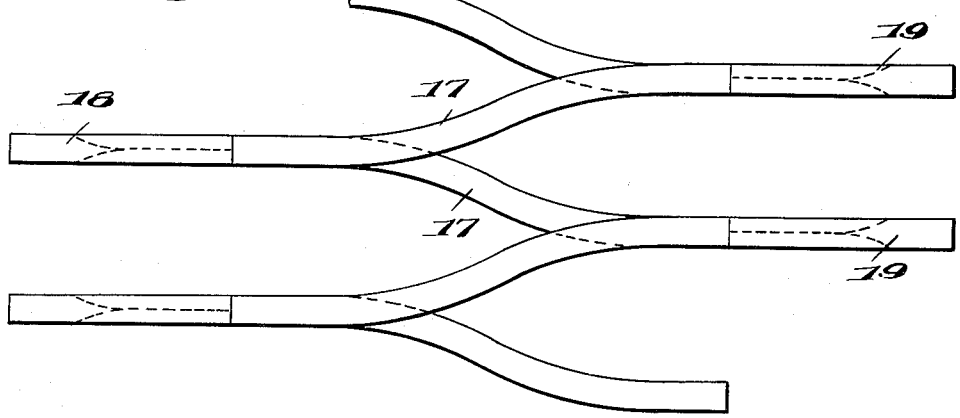
Figures 8, 9:
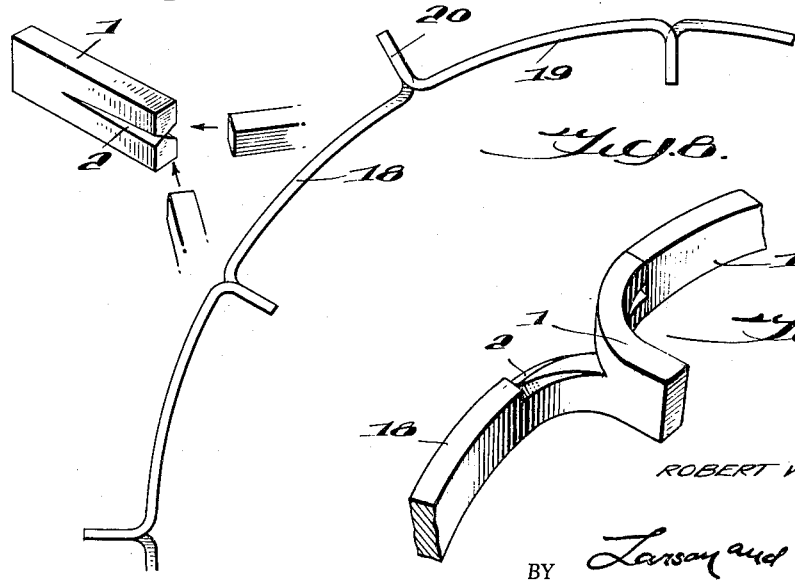
Figure 10:
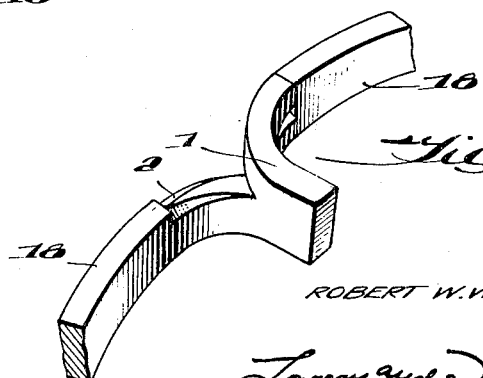

Other objects and many of the attendant advantages of the present invention will become apaprent upon consideration of the following detailed specification taken in connection with the accompanying drawings wherein:

FIGURE 1 is a top-plan view of an end block in accordance with the present invention, FIGURE 2 is a side-elevation of an end block, FIGURE 3 is an end-elevation of the block shown in FIGURES 1 and 2, FIGURE 4 is a side-elevation showing a series of rods connected to a plurality of end blocks, FIGURE 5 is a top-plan view of the embodiment shown in FIGURE 4, FIGURE 6 is a side-elevation of a modified form of bar, FIGURE 7 is a view showing the plurality of the rods of FIGURE 6 connected to end blocks, FIGURE 8 is a view showing the parallel rods extended into a continuous rod, FIGURE 9 is the view showing the manner of welding the rods to the end block, FIGURE 10 is a detailed view of the one joint in expanded position.

Referring now to these drawings wherein like numerals indicate like parts throughout the several views there is shown at 1 in FIGURE 1 an end block having upper and lower tapered slits or grooves 2 and 3 therein. It can be seen that these grooves extend from one end of the block to a point intermediate the ends so that there is provided an end portion 4 which is of full cross-sectional area without any portion thereof being cut away. The taper of the groove may be made of any desired depth and configuration to produce any desired results as will be fully apparent hereinafter.

Referring now to FIGURE 4 there is shown a series of end blocks 5, 6, and 7, for example, which connect pairs of ends of rods together whereas end blocks 8, 9, and 10, for example, connect pairs of the other ends of the rods together. As shown, end block 5 interconnects the ends of rods 11 and 12. The opposite end of rod 11 is connected to block 8 whereas the opposite end of rod 12 is connected to an end block which would be mounted above block 8. The rods are connected to the blocks by welding or brazing the ends thereof to the end faces of the end blocks such as faces 13 and 14 shown in FIGURE 3. It is possible to stack the end blocks and rods as shown in FIGURE 4 and flash weld the rods to the blocks along the lines 15 and 16. The flash weld interconnecting the end blocks will be of neglible strength and have little effect on the operating characteristic of the assembly. A mat of assembled end blocks and rods may be formed in the shape of a cylinder and joined so as to produce a continuous cylindrical arrangement suitable for use as a continuous rod warhead as referred to previously.

Alternatively rods may be bent in the form shown in FIGURE 6 at 17 and a series of these rods interconnected with end blocks 18 and 19 as shown in FIGURE 7. Upon completion of a rod and end block assembly such as shown in FIGURE 7, the assembly may be compressed so that it is in substantially the same form as that shown in FIGURE 4.

In FIGURE 8 is shown an arrangement of rods when expanded to form a continuous rod assembly. A pair of rods 18 and 19, for example, are interconnected by an end block 20. In the event that the original assembly is of cylindrical form, the assembly will form a large ring when in the expanded position. Each of the joints will be in the shape shown in FIGURE 10. It can be seen that the point of maximum stress is at the end of the tapered groove. The end block at this point has maximum strength characteristics. Furthermore, the point of maximum bend stress is at a point spaced from the point where the rods are welded to the end block. The tapered grooves provide means for absorbing the energy of the impact of the force tending to expand the rods so that the entire stress is not suddenly placed on any one point in the end block.

Obviously many modifications and variations of the present invention are possible in light of the above teachings. What is claimed as new and desired to be secured by Letters Patents is:

1. A rod joint comprising a pair of rods and a block for connecting the rods and absorbing the impact of forces tending to separate the rods, one end portion of the block being solid and the opposite end portion being bifurcated into end branches, and means connecting an end of each of the rods with one of the end branches, said end branches being formed by a recess disposed centrally in said bifurcated end portion of the block and defined by two grooves disposed longitudinally on opposite sides of the bifurcated end portion and each tapering both inwardly extending from its side of the end portion towards the longitudinal axis of the end portion and inwardly extending from the end of the block to a point adjacent the center of the block.

2. A rod joint according to claim 1 wherein the block has a cross sectional area substantially equal to the total cross sectional area of the pair of rods.

3. A rod joint according to claim 1 wherein said end of the rod abuts the free end of the end branch with the respective end portions of the rod and branch in longitudinal alignment.

4. A rod assembly comprising a plurality of rods disposed in stacked, substantially parallel relationship and a plurality of blocks connecting rod pairs to form a continuous sequence of the rods, each of the blocks having a solid free end portion and a bifurcated end portion providing end branches to each of which one of the rods is connected.

References Cited in the file of this patent

UNITED STATES PATENTS

| | | |
|---|---|---|
| 281,760 | Gingras | July 24, 1883 |
| 413,730 | Palmer | Oct. 29, 1889 |
| 1,408,675 | Wimberg | Mar. 7, 1922 |
| 1,764,617 | Ford | June 17, 1930 |
| 1,860,521 | Anderson | May 31, 1932 |
| 1,973,113 | Schulz | Sept. 11, 1934 |
| 2,071,809 | Anderson | Feb. 23, 1937 |
| 2,338,485 | Beyer | Jan. 4, 1944 |
| 2,404,017 | Wilkinson | July 16, 1946 |
| 2,477,263 | Otterson | July 26, 1949 |

FOREIGN PATENTS

| | | |
|---|---|---|
| 13,737 | Great Britain | July 5, 1901 |